US 9,995,834 B2

United States Patent
Tenghamn

(10) Patent No.: US 9,995,834 B2
(45) Date of Patent: Jun. 12, 2018

(54) VARIABLE MASS LOAD MARINE VIBRATOR

(71) Applicant: PGS Geophysical AS, Oslo (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 255 days.

(21) Appl. No.: 14/062,182

(22) Filed: Oct. 24, 2013

(65) Prior Publication Data

US 2014/0334259 A1    Nov. 13, 2014

Related U.S. Application Data

(60) Provisional application No. 61/820,648, filed on May 7, 2013.

(51) Int. Cl.
  *G01V 1/38* (2006.01)
  *G01V 1/133* (2006.01)
  *G01V 1/143* (2006.01)
  *G01V 1/02* (2006.01)

(52) U.S. Cl.
  CPC ............ *G01V 1/133* (2013.01); *G01V 1/143* (2013.01); *G01V 1/159* (2013.01); *G01V 2210/1293* (2013.01)

(58) Field of Classification Search
  USPC ........................................................ 367/20
  See application file for complete search history.

(56) References Cited

U.S. PATENT DOCUMENTS

| | | | |
|---|---|---|---|
| 3,241,099 A | * | 3/1966 | Elston ................ B06B 1/0607 367/165 |
| 3,384,868 A | | 5/1968 | Brown |
| 3,978,940 A | | 9/1976 | Bouyoucos |
| 4,175,311 A | * | 11/1979 | Bunyan ................... F16B 7/00 164/108 |
| 4,185,714 A | | 1/1980 | Pascouet et al. |
| 4,211,301 A | | 7/1980 | Mifsud |
| 4,231,112 A | | 10/1980 | Massa |
| 4,483,411 A | | 11/1984 | Mifsud |
| 4,556,963 A | | 12/1985 | Hugus et al. |

(Continued)

FOREIGN PATENT DOCUMENTS

| | | |
|---|---|---|
| EP | 0190861 A2 | 8/1986 |
| EP | 0835462 B1 | 1/2003 |

(Continued)

OTHER PUBLICATIONS

Donskoy, Dimitri M., and Joseph E. Blue. "A new concept of a low-frequency underwater sound source." The Journal of the Acoustical Society of America 95.4 (1994): 1977-1982.*

(Continued)

*Primary Examiner* — Isam A Alsomiri
*Assistant Examiner* — Jonathan D Armstrong

(57) ABSTRACT

Embodiments related to addition of a variable mass load to the shell of a marine vibrator to compensate for air spring effects. An embodiment provides a marine vibrator, comprising: an outer shell; a driver disposed at least partially within the outer shell and coupled thereto; and a mass load coupled to an exterior surface of the outer shell; wherein the marine vibrator has a resonance frequency selectable based at least in part on the mass load.

19 Claims, 12 Drawing Sheets

(56) References Cited

U.S. PATENT DOCUMENTS

| | | | |
|---|---|---|---|
| 4,557,348 A | 12/1985 | Mifsud | |
| 4,578,784 A | 3/1986 | Mifsud | |
| 4,739,859 A | 4/1988 | Delano | |
| 4,785,430 A | 11/1988 | Cole | |
| 4,853,905 A | 8/1989 | Myers | |
| 4,941,202 A | 7/1990 | Upton | |
| 5,016,228 A | 5/1991 | Arnold | |
| 5,050,129 A | 9/1991 | Schultz | |
| 5,126,979 A | 6/1992 | Rowe, Jr. et al. | |
| 5,199,005 A | 3/1993 | Forsberg | |
| 5,206,839 A | 4/1993 | Murray | |
| 5,225,731 A | 7/1993 | Owen | |
| 5,233,570 A | 8/1993 | Donskoy | |
| 5,579,287 A * | 11/1996 | Boucher | B06B 1/0618 367/159 |
| 5,646,380 A | 7/1997 | Vaage | |
| 5,694,374 A * | 12/1997 | Ripoll | B06B 1/0618 310/337 |
| 5,757,726 A | 5/1998 | Tenghamn et al. | |
| 5,757,728 A | 5/1998 | Tenghamn et al. | |
| 5,959,939 A | 9/1999 | Tenghamn et al. | |
| 5,978,316 A | 11/1999 | Ambs | |
| 6,009,047 A | 12/1999 | Barger | |
| 6,041,888 A | 3/2000 | Tenghamn | |
| 6,076,629 A | 6/2000 | Tengham | |
| 6,076,630 A | 6/2000 | Ambs | |
| 6,085,862 A | 7/2000 | Tenghamn | |
| 6,230,840 B1 * | 5/2001 | Ambs | B63G 8/001 181/113 |
| 6,173,803 B1 | 11/2001 | Barger | |
| 6,483,778 B1 * | 11/2002 | Pozzo | G10K 11/006 367/172 |
| 6,556,510 B2 | 4/2003 | Ambs | |
| 6,606,958 B1 | 8/2003 | Bouyoucos | |
| 6,624,539 B1 | 9/2003 | Hansen et al. | |
| 6,711,097 B1 | 3/2004 | Engdahl | |
| 6,851,511 B2 | 2/2005 | Tenghamn | |
| 6,901,028 B2 | 5/2005 | Clayton et al. | |
| 7,142,481 B1 | 11/2006 | Metzbower et al. | |
| 7,468,932 B2 | 12/2008 | Tenghamn | |
| 7,539,079 B2 | 5/2009 | Hoogeveen et al. | |
| 7,551,518 B1 | 6/2009 | Tenghamn | |
| 7,562,740 B2 | 7/2009 | Ounadjela | |
| 7,881,158 B2 | 2/2011 | Tenghamn | |
| 7,926,614 B2 | 4/2011 | Tenghamn et al. | |
| 7,929,380 B2 | 4/2011 | Wei et al. | |
| 7,957,220 B2 | 6/2011 | Howlid et al. | |
| 7,974,152 B2 | 7/2011 | Tenghamn | |
| 8,050,139 B2 | 11/2011 | Berstad | |
| 8,050,867 B2 | 11/2011 | Johnson et al. | |
| 8,061,471 B2 | 11/2011 | Wei | |
| 8,079,440 B2 | 12/2011 | Laycock | |
| 8,081,540 B2 | 12/2011 | Ross | |
| 8,094,514 B2 | 1/2012 | Tenghamn | |
| 8,098,542 B2 | 1/2012 | Hillesund et al. | |
| 8,102,731 B2 | 1/2012 | Cambois | |
| 8,154,176 B2 | 4/2012 | Karakaya et al. | |
| 8,167,082 B2 | 5/2012 | Eick et al. | |
| 8,174,927 B2 | 5/2012 | Hopperstad et al. | |
| 8,189,426 B2 | 5/2012 | West et al. | |
| 8,205,711 B2 | 6/2012 | Hopperstad et al. | |
| 8,261,875 B2 | 9/2012 | Eick et al. | |
| 8,331,198 B2 | 12/2012 | Morozov et al. | |
| 8,335,127 B2 | 12/2012 | Tenghamn | |
| 8,342,288 B2 | 1/2013 | Eick et al. | |
| 8,400,872 B2 | 3/2013 | Gulgne et al. | |
| 8,427,901 B2 | 4/2013 | Lunde et al. | |
| 8,441,892 B2 | 5/2013 | Morozov et al. | |
| 8,446,798 B2 | 5/2013 | Tenghamn | |
| 8,630,149 B2 | 1/2014 | Thompson et al. | |
| 8,634,276 B2 | 1/2014 | Morozov et al. | |
| 8,670,292 B2 | 3/2014 | Engdahl | |
| 8,804,462 B2 | 8/2014 | Barbour et al. | |
| 8,971,152 B2 | 3/2015 | Chelminski | |
| 2006/0193203 A1 | 8/2006 | Tenghamn et al. | |
| 2008/0253226 A1 | 10/2008 | Tenghamn et al. | |
| 2009/0147626 A1 | 6/2009 | Vahida et al. | |
| 2009/0279387 A1 | 11/2009 | Tenghamn et al. | |
| 2010/0118646 A1 | 5/2010 | Tenghamn | |
| 2010/0118647 A1 | 5/2010 | Tenghamn | |
| 2010/0322028 A1 | 12/2010 | Tenghamn | |
| 2011/0038225 A1 | 2/2011 | Tenghamn | |
| 2011/0069741 A1 | 3/2011 | Erickson | |
| 2011/0075520 A1 | 3/2011 | Gulgne et al. | |
| 2011/0085422 A1 | 4/2011 | Thompson et al. | |
| 2011/0090759 A1 | 4/2011 | Laycock | |
| 2011/0162906 A1 | 7/2011 | Harper | |
| 2011/0297476 A1 | 12/2011 | Harper et al. | |
| 2011/0317515 A1 | 12/2011 | Tenghamn | |
| 2012/0048641 A1 | 3/2012 | Eick et al. | |
| 2012/0075955 A1 | 3/2012 | Dean | |
| 2012/0081997 A1 | 4/2012 | Babour et al. | |
| 2012/0113747 A1 | 5/2012 | Ferber | |
| 2012/0147699 A1 | 6/2012 | Dellinger et al. | |
| 2012/0147709 A1 | 6/2012 | Zowarka, Jr. et al. | |
| 2012/0155217 A1 | 6/2012 | Dellinger et al. | |
| 2012/0188845 A1 | 7/2012 | Jeffryes | |
| 2012/0232780 A1 | 9/2012 | Delson et al. | |
| 2012/0314536 A1 | 12/2012 | Bagaini | |
| 2013/0037342 A1 | 2/2013 | Engdahl | |
| 2013/0100777 A1 | 4/2013 | Ruet | |
| 2014/0238773 A1 | 8/2014 | Sallas | |
| 2014/0334254 A1 | 11/2014 | Zrostlik et al. | |
| 2014/0334259 A1 | 11/2014 | Tenghamn | |
| 2014/0340985 A1 | 11/2014 | Tenghamn et al. | |
| 2015/0085605 A1 | 3/2015 | Tenghamn | |
| 2015/0085606 A1 | 3/2015 | Tenghamn et al. | |
| 2015/0085607 A1 | 3/2015 | Tenghamn | |
| 2015/0085608 A1 | 3/2015 | Tenghamn et al. | |
| 2015/0234072 A1 | 8/2015 | McConnell | |

FOREIGN PATENT DOCUMENTS

| | | |
|---|---|---|
| EP | 2096627 A1 | 9/2009 |
| GB | 1087504 A | 10/1967 |
| GB | 1145949 A | 3/1969 |
| GB | 1183791 A | 3/1970 |
| GB | 2411723 A | 9/2005 |
| RU | 93052952 A | 2/1995 |
| RU | 2159945 C1 | 11/1999 |
| WO | 9530912 A1 | 11/1995 |
| WO | 9701770 A1 | 1/1997 |
| WO | 0071266 A1 | 11/2000 |

OTHER PUBLICATIONS

Brigham, G., and B. Glass. "Present status in flextensional transducer technology." The Journal of the Acoustical Society of America 68.4 (1980): 1046-1052.*

Tressler, James F., et al. "Finite element analysis of the cymbal-type flextensional transducer." IEEE transactions on ultrasonics, ferroelectrics, and frequency control 45.5 (1998): 1363-1369.*

Ochoa, Pilar, et al. "Tunability of cymbals as piezocomposite transducers." Journal of electroceramics 14.3 (2005): 221-229.*

Ochoa, P., et al. "Advantages and limitations of cymbals for sensor and actuator applications." Sensors and Actuators A: Physical 132.1 (2006): 63-69.*

Howarth, Thomas R. Acoustic projectors for AUV and UUV applications in shallow water regions. Naval Research Lab Washington DC, 1999.*

Rolt, Kenneth D. "History of the flextensional electroacoustic transducer." The Journal of the Acoustical Society of America 87.3 (1990): 1340-1349.*

Rune Tenghamn, "PGS Electrical Marine Vibrator," Tech Link, Nov. 2005, pp. 1-3, vol. 5, No. 11, Publication of PGS Geophysical.

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

(56) References Cited

OTHER PUBLICATIONS

Feng et al., A Class IV Flextensional Device Based on Electrostrictive Poly(vinylidene fluoride-trifluoroethylene.
Ralph S. Woollett, "Underwater Helmholtz-Resonator Transducers: General Design Principles," NUSC Technical.
Rolex Spring Catalog, MW Industries, Inc., 2009.
Fons Ten Kroode et al., "Broadband seismic data—The importance of low frequencies," Geophysics, Mar.-Apr. 2013, pp. WA3-WA14, vol. 78, No. 2.
Ralph S. Woollett, "Current Approaches to the Miniaturization and Pressure Release Problems of VLF Transducers," Naval Underwater Systems Center, Nov. 5, 1973.
Search report issued by the United Kingdom Intellectual Property Office on patent application No. GB1407096.5, dated Sep. 19, 2014, 5 pages.
UK Search report dated Jun. 26, 2015, in the prosecution of application No. GB1502162.9, 4 pages.
UK Search report dated Jun. 26, 2015, in the prosecution of application No. GB15021660.3, 5 pages.
Australian Examination report for Application No. 2014202439 dated Aug. 28, 207.

* cited by examiner

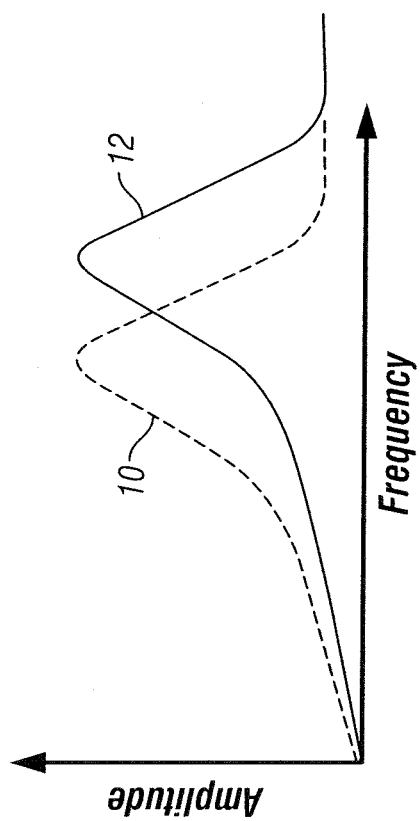
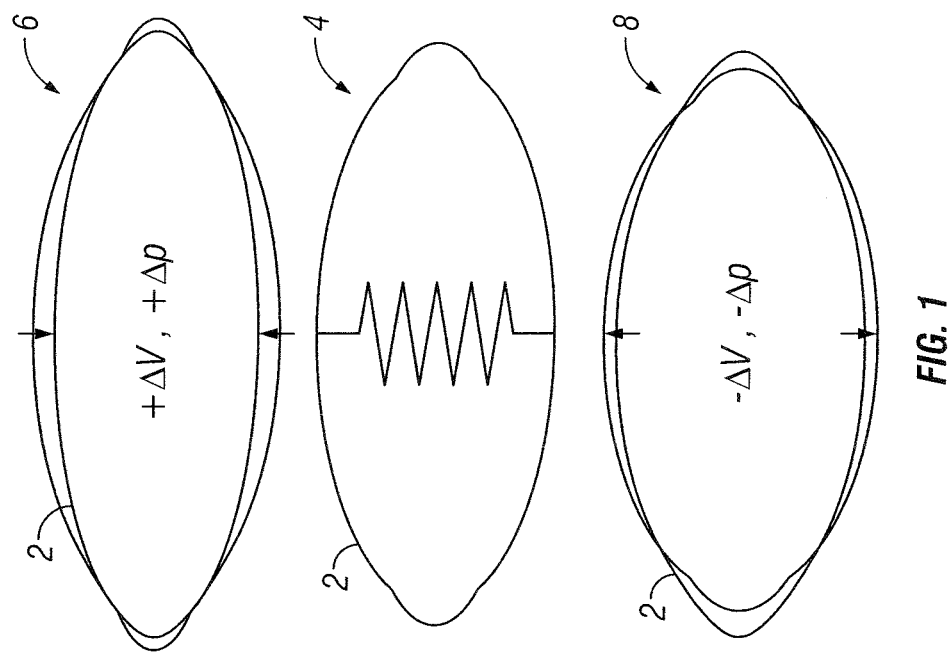

VARIABLE MASS LOAD MARINE VIBRATOR

CROSS-REFERENCE TO RELATED APPLICATIONS

The present application claims the benefit of U.S. Provisional Application No. 61/820,648, filed May 7, 2013, entitled "Variable Mass Load Acoustic Marine Vibrator," the entire disclosure of which is incorporated herein by reference.

BACKGROUND

Embodiments relate generally to marine vibrators for marine geophysical surveys. More particularly, embodiments relate to addition of a variable mass load to the outer shell of a marine vibrator to compensate for air spring effects.

Sound sources are generally devices that generate acoustic energy. One use of sound sources is in marine seismic surveying in which the sound sources may be employed to generate acoustic energy that travels downwardly through water and into subsurface rock. After interacting with the subsurface rock, e.g., at boundaries between different subsurface layers, some of the acoustic energy may be returned toward the water surface and detected by specialized sensors. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in seismic surveying includes marine vibrators, such as hydraulically powered sources, electro-mechanical vibrators, electrical marine seismic vibrators, and sources employing piezoelectric or magnetostrictive material. Vibrator sources typically generate vibrations through a range of frequencies in a pattern known as a "sweep" or "chirp."

Prior sound sources for use in marine seismic surveying have typically been designed for relatively high-frequency operation (e.g., above 10 Hz). However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than higher frequency sound waves. Thus, efforts have been undertaken to develop sound sources that can operate at low frequencies.

Marine vibrators have been developed that may have least one resonance frequency of about 10 Hz or lower. In order to achieve a given level of output in the water, these marine vibrators typically need to undergo a change in volume. In order to work at depth while minimizing structural weight, the marine vibrator may be pressure balanced with external hydrostatic pressure. As the internal gas (e.g., air) in the source increases in pressure, the bulk-modulus (stiffness) of the internal gas also rises. This increase in bulk-modulus or "air spring" of the internal gas tends to be a function of the operating depth of the source. Further, the stiffness of the structure and the internal gas are primary determining factors in the source's resonance frequency. Accordingly, the resonance of the marine vibrator may undesirable increase when the vibrator is towed at depth, especially in vibrators where the interior volume of the source may be pressure balanced with the external hydrostatic pressure.

BRIEF DESCRIPTION OF THE DRAWINGS

These drawings illustrate certain aspects of some of the embodiments of the present invention and should not be used to limit or define the invention.

FIGS. 1 and 2 illustrate the effect of the air spring as the marine vibrator is being towed deeper in accordance with example embodiments.

DETAILED DESCRIPTION

Figure 3:
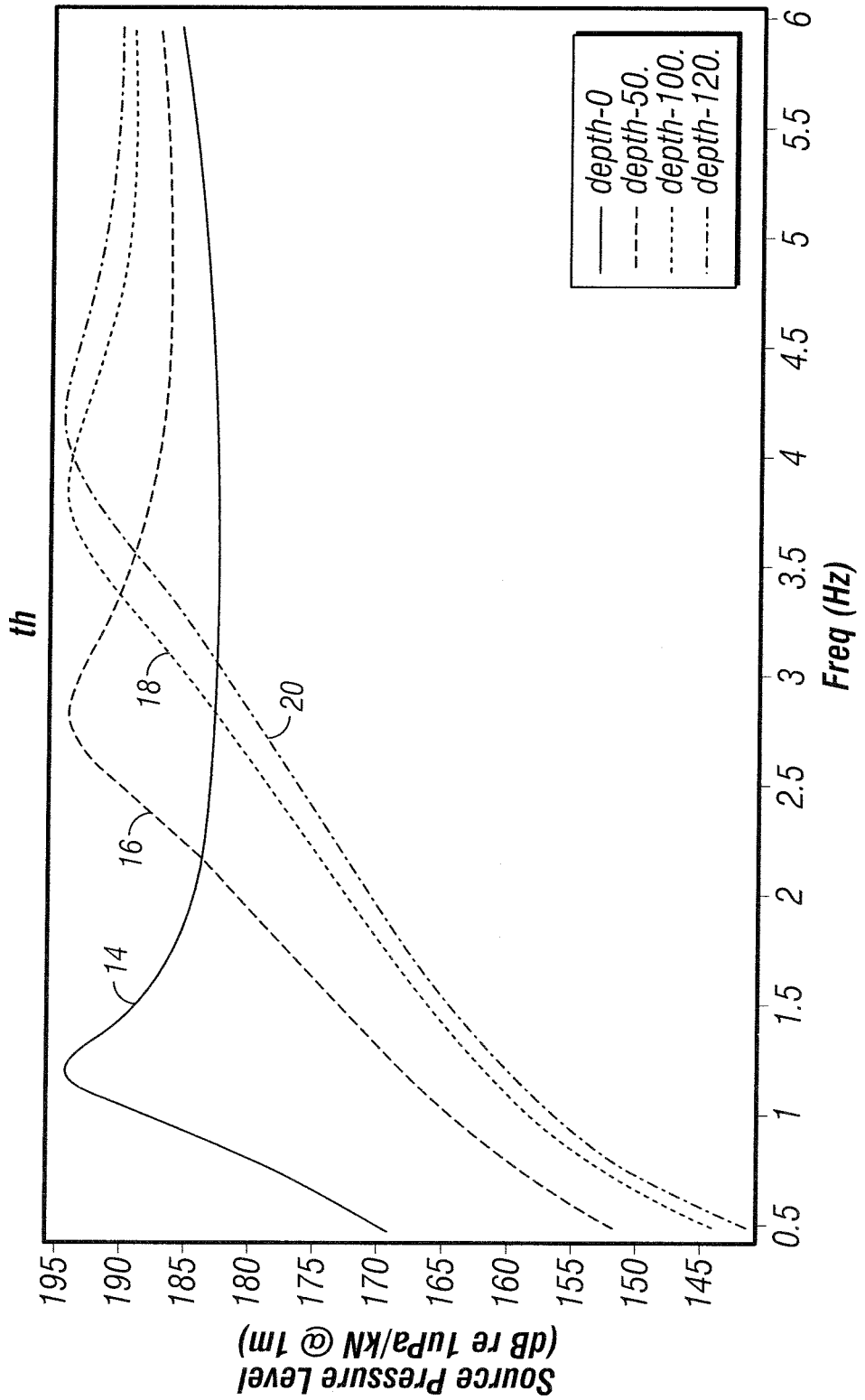
FIG. 3 is a simulated amplitude spectra showing the effect of compressed air that generates an air spring as the marine vibrator is being towed deeper in accordance with example embodiments.

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine vibrators for marine geophysical surveys. In one or more embodiments, a variable mass load may be added to the shell of a marine vibrator to compensate for air spring effects. As discussed in more detail below, the variable mass load may shift the resonance frequency of the marine vibrator lower to alleviate problems due to pressure increases in the acoustic vibrator.

Marine vibrators may be used in marine geophysical surveying to generate acoustic energy that travels downwardly through water and downwardly into the earth. Embodiments of the marine vibrators may include an outer shell that contains a gas pressure. By way of example, a marine vibrator may include an outer shell that defines an internal volume in which a gas may be disposed. Examples of suitable marine vibrators may include hydraulically powered vibrators, electro-mechanical vibrators, electrical marine seismic vibrators, and vibrators employing piezoelectric or magnetostrictive material. In some embodiments, the marine vibrator may be a flextensional shell-type source. Flextensional devices including actuators and transducers act as mechanical transformers, which transform and amplify the displacement and force generated in the active element to meet the demands of different applications. Flextensional shell-type sources are generally marine vibrators having an outer shell that vibrates and flexes to generate acoustic energy. Examples of flextensional shell-type sources can be found in U.S. Pat. No. 8,446,798, which is herein incorporated by reference.

In some embodiments, the marine vibrator may have a pressure compensation system. The pressure compensation system may be used, for example, to equalize the internal gas pressure of the marine vibrator's outer shell with the external pressure. The internal gas pressure of the marine vibrator's outer shell will be referred to herein as the "shell internal gas pressure." Pressure compensation may be used, for example, with marine vibrators, where the source needs to undergo a change in volume to achieve a given level of output. As the depth of the marine vibrator increases, the shell internal gas pressure can be increased to equalize pressure with the increasing water pressure due to depth. A gas (e.g., air) may be introduced into the outer shell of the vibrator, for example, to increase the internal gas pressure.

However, increasing the shell internal gas pressure may create an "air spring" effect that undesirably impacts the resonance frequency of the marine vibrator. In particular, the resonance frequency may increase as the shell internal gas pressure increases. The pressurized gas inside a marine vibrator can have a stiffness higher than that of the outer shell of the marine vibrator in some embodiments. Those of ordinary skill in the art, with the benefit of this disclosure, should appreciate an increase in the shell internal gas pressure may also result in an increase of the bulk modulus (stiffness) of the gas (e.g., air) in the outer shell. As the resonance frequency of the marine vibrator is based at least on the combination of the stiffness of the outer shell and the stiffness of the gas in the outer shell, this bulk modulus increase impacts the resonance frequency. Thus, the resonance of the marine vibrator may undesirably increase when the vibrator is towed at depth.

FIGS. 1 and 2 illustrate the effect of an air spring (e.g., compressed air) on a marine vibrator at depth in accordance with example embodiments. In FIG. 1, the shell internal gas is represented by reference number 2. To illustrate the air spring, the shell internal gas 2 is shown at ambient pressure at 4, under compression at 6, and under expansion at 8. With respect to FIG. 2, the curve shown at 10 is a hypothetical representation of the output of a marine vibrator at D meters without pressure compensation while the curve shown at 12 represents the output of the marine acoustic vibrator at D+x meters with pressure compensation. Pressure compensation causes an increase in pressure and resulting increasing in the stiffness of the air spring. As illustrated, the resonance of the marine vibrator shifts higher with pressure compensation, thus showing how a stiff air spring may result in a higher resonance frequency.

FIG. 3 is another simulated amplitude spectrum from a finite element simulation showing the effect of compressed air (e.g., an air spring) as a function of depth. The curves in FIG. 3 represent the output of a marine vibrator towed at varying depth with pressure compensation. In particular, the curves in FIG. 3 represent the output of the marine vibrator towed at 0 meters, 50 meters, 100 meters, and 120 meters, respectively, shown at 14, 16, 18, and 20 in FIG. 3. As illustrated, the increase in resonance was more pronounced at greater depths.

To compensate for changes in the shell internal gas pressure, a variable mass load may be added to the marine vibrator. By way of example, a variable mass load may be added to the outer shell of the marine vibrator to shift the resonance frequency. In some embodiments, the variable mass load may increase in mass with increasing depth of the marine vibrator in the water. In particular embodiments, the variable mass load may comprise a container attached to the outer shell of the marine vibrator. The container may be configured to fill with water as the marine vibrator is lowered into the water. In certain embodiment, the variable mass load may be added outside of the outer shell. In alternative embodiments, the variable mass load may be added inside of the outer shell. The variable mass load may be appropriately sized to compensate for the entire frequency change due to depth resulting in the same resonance frequency independent of water depth.

Figure 4:
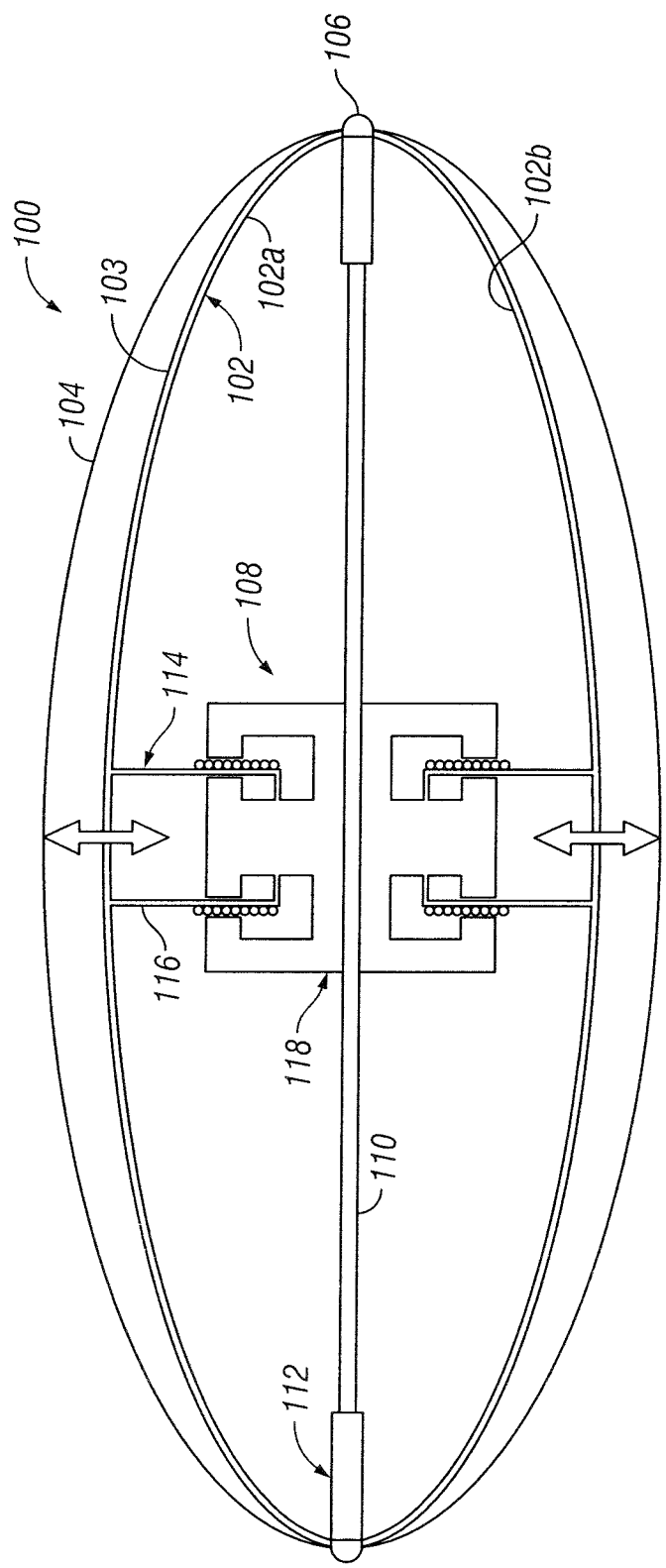
FIG. 4 illustrates an example embodiment of a marine vibrator with a variable mass load in cross-section.

FIG. 4 illustrates a marine vibrator 100 that includes an outer shell 102 with a variable mass load 104. The marine vibrator 100 of FIG. 3 is shown in cross-section. As illustrated the marine vibrator 100 includes the outer shell 102, which may be made from spring steel or similar resilient metal, and which may be a class V flextensional transducer. In the illustrated embodiment, the form of the outer shell 102 may be generally referred to as being flextensional. Examples of suitable flextensional shells are generally discussed in U.S. Pat. No. 6,076,629 issued to Tenghamn, the disclosure of which is incorporated herein by reference. As illustrated, the outer shell 102 may be formed, for example, by two shell side portions 102a, 102b joined at or near the ends of their longer, major axes by respective hinges 106. In particulate embodiments, the outer shell 102 may act as a spring having a first spring constant to generate a first resonance frequency. As would be understood by one of ordinary skill in the art with the benefit of this disclosure, the spring constant of the outer shell 102 may be determined by the dimensions of the shell 102 (e.g., about 2 meters wide by about 2 meters tall), the material make-up of the shell 102, and the shape of the shell 102 in a relaxed state, for example.

Although FIG. 4 depicts a flextensional shell of essentially semi-elliptical shape, flextensional shells of other shapes, including convex, concave, flat, or combinations thereof may also be suitable. In some embodiments, the dimensions, material make-up, and shape of the outer shell 102 may be selected to provide a soft spring constant for vibrations of between about 1-10 Hz when the shell 102 is submerged in water.

In the illustrated embodiment, the marine vibrator 100 further includes the variable mass load 104 attached to the outer shell 102. The variable mass load 104 may be attached to an exterior surface 103 of the outer shell 102. As illustrated, the variable mass load 104 may be in the form of a container attached to the outer shell 102. While not shown, the container may include holes or other openings formed therein. Accordingly, when the marine vibrator 100 is lowered into the water, water may enter the container, thus increasing the container's mass. In this manner, the variable mass load 104 may be variable based on the amount of water in the container, thus providing a resonance frequency for the marine vibrator 100 selected based at least in part on the variable mass load 104.

As illustrated, the marine vibrator 100 may further include a driver 108, which may be an electro dynamic driver. The outer shell 102 together with the driver 108 may be operable to determine a first resonance frequency of the marine vibrator 100. In some embodiments, the driver 108 may be a "moving coil" or "voice coil" driver, which may provide the ability to generate very large acoustic energy amplitudes. Although the particular embodiment described herein shows only a single, bi-directional driver, embodiments with one or more uni-directional drivers or in which a plurality of drivers are utilized in parallel, are within the scope of the invention. The driver 108 may be connected to the face of the two shell side portions 102a, 102b. For example, as illustrated in FIG. 3, the driver 108 may be connected at approximately the vertical mid-point of the face of flextensional shell 102, proximate the ends of the shorter, minor axes of the shell side portions 102a, 102b.

In some embodiments, the marine vibrator 100 further may include a fixture 110 capable of suspending driver 108 within outer shell 102. For example, in the illustrated embodiment, the fixture 110 extends along the major axis of outer shell 102 and is coupled to the outer shell 102 with linear bearings 112. In some embodiments, the fixture 110 may be circular in cross section and may be mounted to the hinges 106 using the linear bearings 112. Such mounting may enable contraction of the major axis of the outer shell 102 when the minor axis is enlarged by the motion of the driver 108.

As illustrated, the driver 108 may comprise a bi-directional, moving coil driver, having two sets of electric coil 114, transmission element 116, and magnetic circuitry 118, which is capable of generating a magnetic field. As illustrated, the magnetic circuitry 118 may be connected to the fixture 110, while the transmission element 116 may connect to the outer shell 102. In some embodiments (not illustrated), this arrangement may be reversed (i.e., the magnetic circuitry 118 connects to the outer shell 102, while the transmission element 116 connects to the fixture 110). By attaching the heavier part (magnetic circuitry 118) of the driver 108 to the outer shell 102, it may be easier to generate low frequencies without having to make the outer shell 102 too weak to allow for a soft spring constant. As illustrated, each transmission element 116 may transfer motion of electric coil 114 to the inner surface of outer shell 102 proximate its minor axis. When electrical current I is applied to the electric coil 114, a force F acting on electric coil 114 may be generated as follows:

$$F = IlB \qquad \text{(Eq. 1)}$$

Where I is the current, l is the length of the conductor in the electric coil 114, and B is the magnetic flux generated by the magnetic circuitry 118. By varying the magnitude of the electrical current and consequently the magnitude of the force acting on the electric coil 114, the length of the driver stroke may vary. The driver 108 may provide stroke lengths of several inches—up to and including about 10"—which may allow the marine vibrator 100 to generated enhanced amplitude acoustic output in the low frequency ranges, for example, between about 1 about 100 Hz, and more particularly, between about 1 and 10 Hz. Often, the magnetic circuitry 118 may comprise permanent magnets, though any device capable of generating a magnetic flux may be incorporated.

As would be understood by one of ordinary skill in the art, the total impedance that may be experienced by a marine vibrator 100 may be expressed as follows:

$$Z_r = R_r + jX_r \qquad \text{(Eq. 2)}$$

where $Z_r$ is total impedance, $R_r$ is radiation impedance, and $X_r$ is reactive impedance.

In an analysis of the energy transfer of the marine vibrator 100, the system may be approximated as a baffled piston. In the expression of the total impedance that will be experienced, the radiation impedance $R_r$ of a baffled piston may be:

$$R_r = \pi a^2 \rho_o c R_1(x) \qquad \text{(Eq. 3)}$$

and the reactive impedance may be:

$$X_r = \pi a^2 \rho_o c X_1(x) \qquad \text{(Eq. 4)}$$

where $$x = 2ka = (4\pi a/\lambda) = (2\omega a/c) \qquad \text{(Eq. 5)}$$

and where $$R_1(x) = 1 - (2/x)J_{1(x)} \text{ and} \qquad \text{(Eq. 6)}$$

$$X_1(x) = \left(\frac{4}{\pi}\right)\int_0^{\pi/2} \sin(x\cos\alpha)\sin^2\alpha \, d\alpha \qquad \text{(Eq. 7)}$$

where $\rho_o$ is the density of water, $\omega$=radial frequency, k=wave number, a=radius of piston, c=sound velocity, $\lambda$=wave length, and $J_1$=Bessel function of the first order.

Using the Taylor series expansion on the above equations yields the following:

$$R_1(x) = \frac{x^2}{2^2 1! 2!} - \frac{x^4}{2^4 2! 3!} + \cdots \qquad \text{(Eq. 8)}$$

$$X_1(x) = \frac{4}{\pi}\left(\frac{x}{3} - \frac{x^3}{3^2 5} + \frac{x^5}{3^2 5^2 7} - \cdots\right) \qquad \text{(Eq. 9)}$$

For low frequencies, when x=2ka is much smaller than 1, the real and imaginary part of the total impedance expression may be approximated with the first term of the Taylor expression. The expressions for low frequencies, when the wave length is much larger than the radius of the piston becomes:

$$R_1(x) = (1/2)(ka)^2 \quad \text{(Eq. 10)}$$

$$X_1(x) \to (8ka)/(3\pi) \quad \text{(Eq. 11)}$$

It follows that, for low frequencies, R will be a small number compared to X, which suggests a very low efficiency signal generation. However, embodiments may introduce a resonance in the lower end of the frequency spectrum so that low frequency acoustic energy may be generated more efficiently. At resonance, the imaginary (reactive) part of the impedance is cancelled, and the marine vibrator may be able to efficiently transmit acoustic energy into the body of water.

Figure 5:
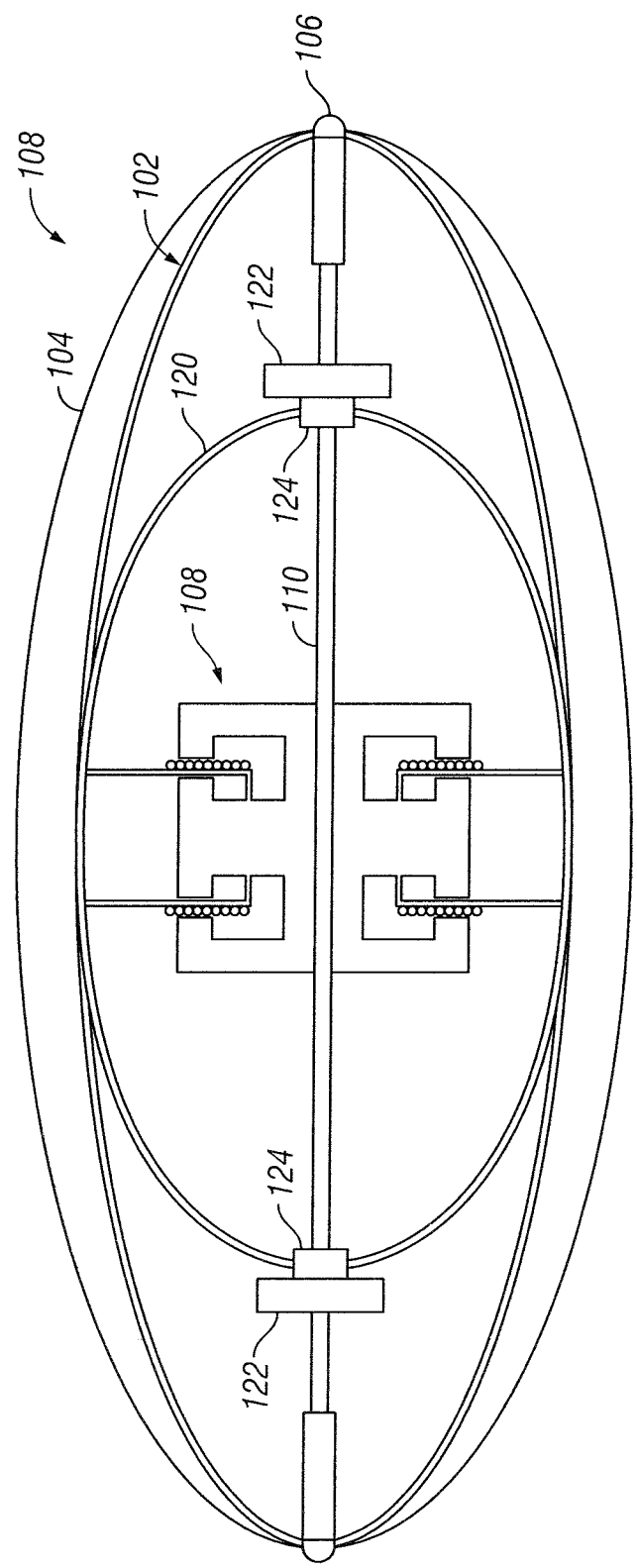
FIG. 5 illustrates another example embodiment of a marine vibrator with a variable mass load in cross-section.

FIG. 5 illustrates another embodiment of a marine vibrator 100 having an outer shell 102 with a variable mass load 104. In the illustrated embodiment, the marine vibrator 100 further includes a spring 120 inside the outer shell 102 with masses 122 attached thereto along the ends of the major axis and slidably supported on the fixture 110 using linear bearing 124. As illustrated, the spring 120 may be generally elliptically shaped. The spring 120 may be coupled to the outer shell 102 proximate the minor axis of each. In the illustrated embodiment, the driver 108 may be coupled to the outer shell 102. The spring 120 with the masses 122 may cause a second system resonance frequency when the outer shell 102 is submerged in water within the seismic frequency range of interest (e.g., between about 1 Hz and about 10 Hz). Although a marine vibrator 100 as shown in FIG. 4 that included only the outer shell 102 acting as a spring would typically display a second resonance frequency, for systems having a size suitable for use in geophysical exploration, the second resonance frequency when the outer shell 102 is submerged in water would typically be much higher than the frequencies within the seismic frequency range of interest.

Figure 6:
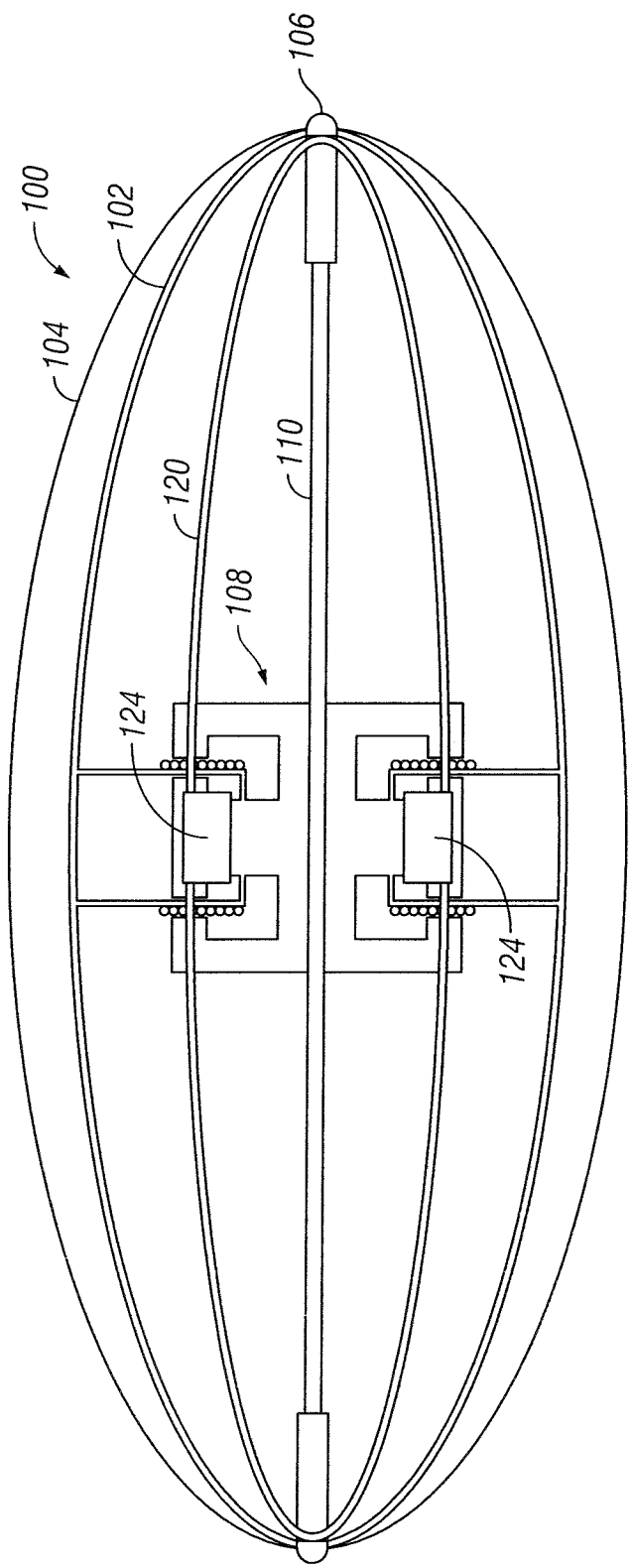
FIG. 6 illustrates yet another example embodiment of a marine vibrator with a variable mass load in cross-section.
Figure 7:
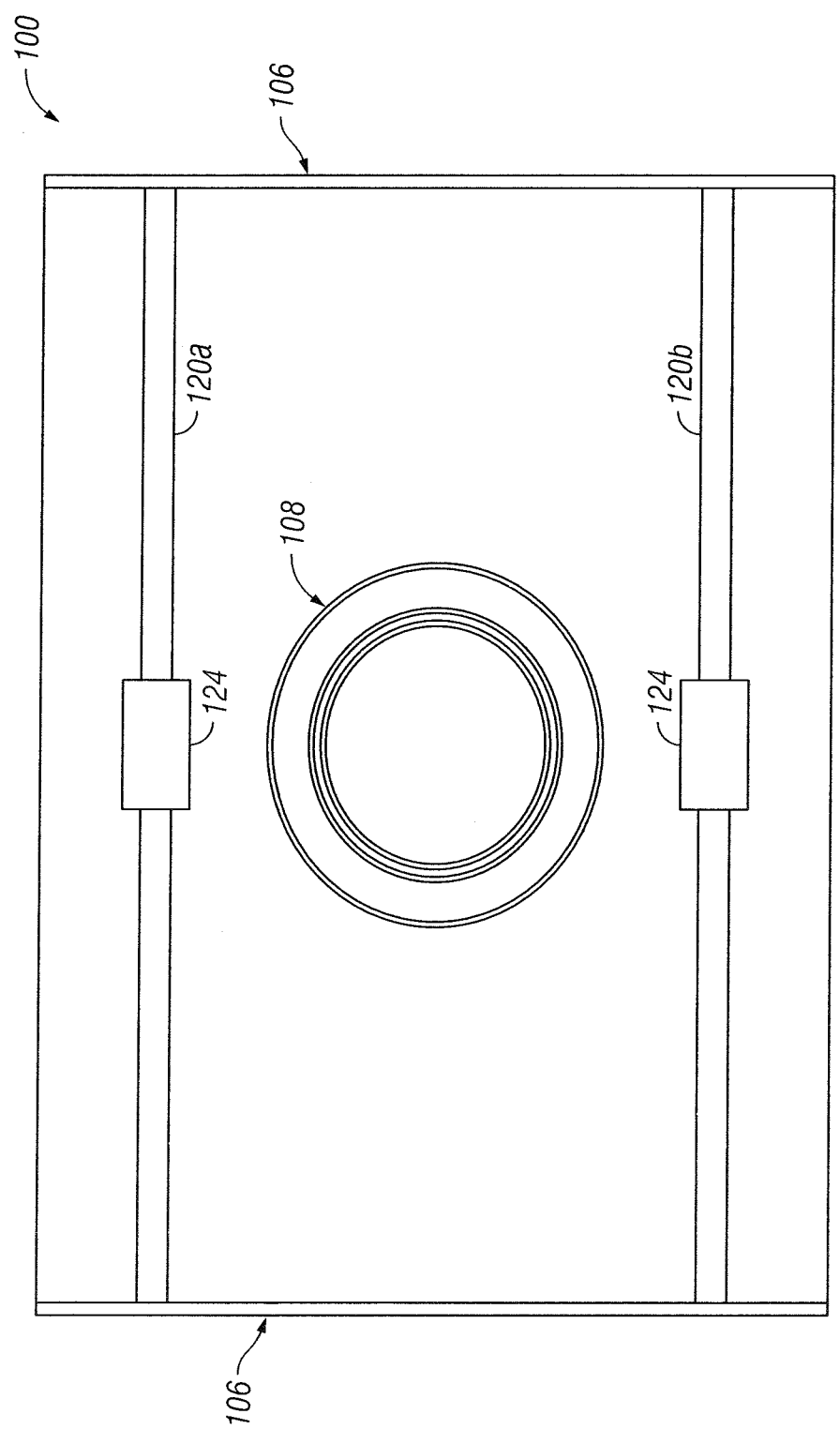
FIG. 7 is a top view of the marine vibrator of FIG. 6 in accordance with example embodiments.

FIG. 6 illustrates yet another embodiment of a marine vibrator 100 having an outer shell 102 with a variable mass load 104. In the illustrated embodiment, the major axis ends of the spring 120 may be coupled to the major axis ends of the outer shell 102 at the hinges 106. Masses 124 may be affixed to the spring 120 proximate its minor axis. As illustrated in FIG. 7, the spring 120 may be vertically divided into two springs, each with added masses 124. In the illustrated embodiment, one spring 120a is disposed above driver 108, while the other inner spring 120b is disposed below driver 108, and driver 108 remains coupled to outer shell 102, as shown on FIG. 6.

In some embodiments, the marine vibrator 100 may display at least one resonance frequency (when submerged in water) between about 1 Hz to about 200 Hz. In alternative embodiments, the marine vibrator 100 may display at least one resonance frequency (when submerged in water) between about 0.1 Hz and about 100 Hz, alternatively, between about 0.1 Hz and about 10 Hz, and alternatively, between about 0.1 Hz and about 5 Hz. In some embodiment, the marine vibrator 100 may display at least two resonance frequencies of about 10 Hz or lower. The first resonance frequency may result substantially from interaction of the outer shell 102 acting as a spring. The second resonance frequency may result substantially from the interaction of the spring 120 with its added masses 124.

Figure 8:
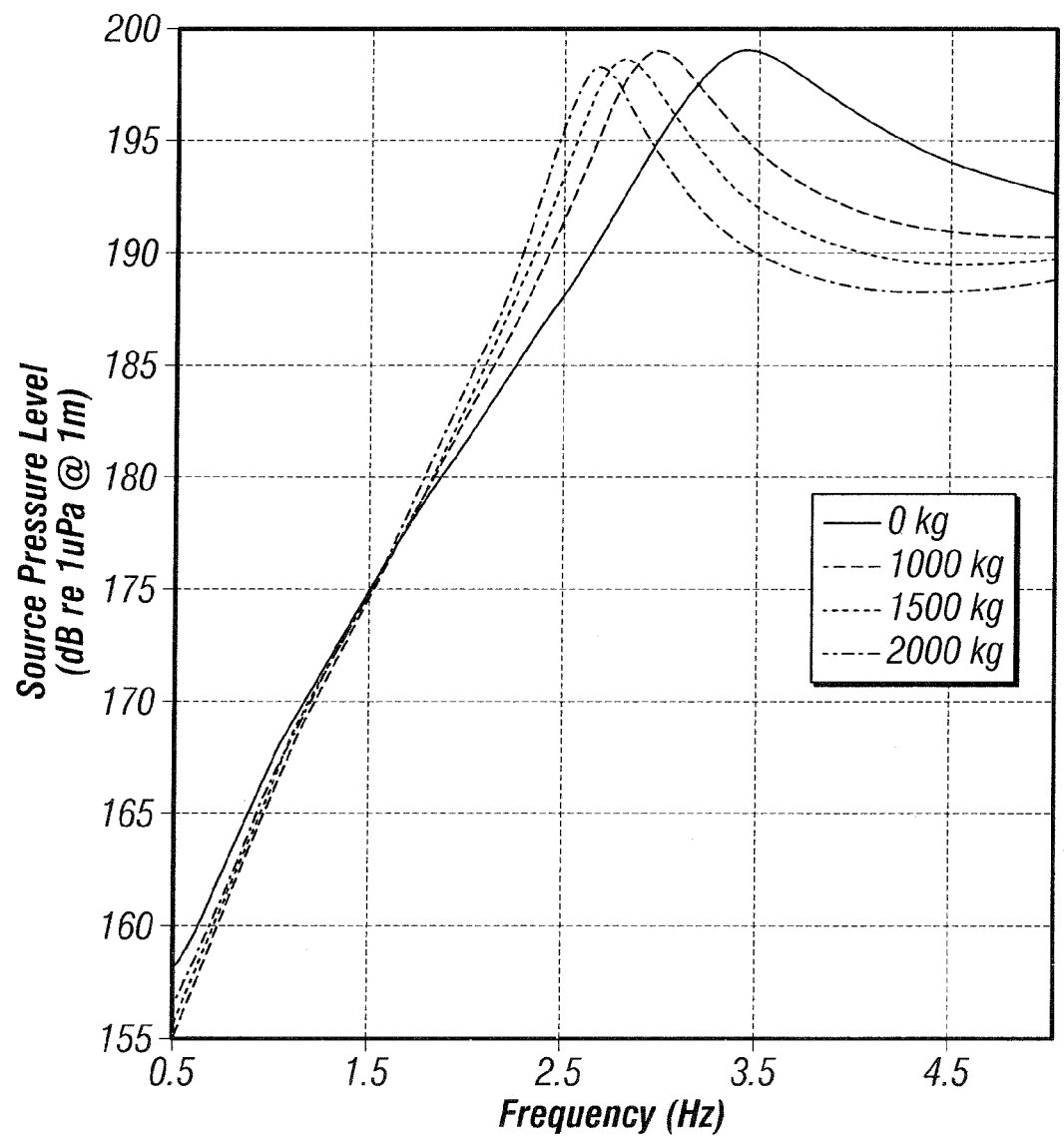
FIG. 8 illustrates a simulated amplitude spectrum showing effect of adding mass load to a marine vibrator in accordance example embodiments.

FIG. 8 shows the results from a simulation of the first resonance frequency of a marine vibrator 100 according to an embodiment. The curves in FIG. 8 represent the output of the marine vibrator 100 towed at 50 meters. The curves in FIG. 8 represent the output of the marine vibrator 100 with the attachment of 0 kilograms ("kg"), 1000 kg, 1500 kg, and 2,000, respectively. As illustrated, the resonance of the marine vibrator 100 was shifted from 3.4 Hz to 2.7 Hz with the addition of 2000 kg. Below 2 Hz, there was very little difference in the sound output.

In evaluating addition of the variable mass load 104, finite element analysis may be utilized as known to those of ordinary skill in the art. In such an analysis, the following principles may be relevant. If the outer shell 102 of the marine vibrator 100 is approximated as a piston, then, for low frequencies, the variable mass load, or the equivalent fluid mass acting on the shell may be:

$$M_{shell} = \rho_o(8a^3/3) \quad \text{(Eq. 12)}$$

where $M_{shell}$ is the mass load of the shell 102, $\rho_o$ is the density of water, and a is the equivalent radius for a piston which corresponds to the size of the outer shell 102. The outer shell 102 may also have a spring constant, for example, in the direction of the moving electrical coils 114 of the marine vibrator 100.

Therefore, with the addition of the variable mass load 104, the first resonance, $f_{resonance-1}$, due to interaction of the outer shell 102 acting as a spring may be substantially determined by the following mass spring relationship:

$$f_{resonance-1} = \frac{1}{2\pi}\sqrt{\frac{K_{shell}}{M_{shell} + M_{mass\ load}}} \quad \text{(Eq. 13)}$$

where $K_{shell}$ is the spring constant of the outer shell 102, $M_{shell}$ is the mass load of the outer shell 102, and the outer shell 102. $M_{mass\ load}$ is the variable mass load 104 attached to the outer shell 102.

To achieve efficient energy transmission in the seismic frequency range of interest, it may be desirable to achieve a second resonance frequency within the seismic frequency range of interest. In the absence of the spring 120 with its added masses 124, the second resonance frequency would occur when the outer shell 102 has its second Eigen-mode. This resonance frequency, however, is normally much higher than the first resonance frequency, and accordingly, would typically be outside the seismic frequency range of interest. As is evident from the foregoing equation, the resonance frequency will be reduced if the mass on the outer shell 102 is increased. This mass may be increased by attachment of the variable mass load 104, for example. However, in order to add sufficient mass to achieve a second resonance frequency within the seismic frequency range of interest, the amount of mass that would need to be added to the outer shell 102 may make such a system less practical for use in marine seismic operations.

In some embodiments, the spring 120 may be included inside the outer shell 102 with added masses 124 on the side of the spring 120. The spring 120 may have a transformation factor $T_{spring}$ between the long and short axis of its ellipse, so that the deflection of the two side portions will have a higher amplitude than the deflection of the end attached to the outer shell 102 and the driver 108.

The effect of such added masses 124 is equivalent to adding mass in the end of the driver 108 where it is attached to the outer shell 102.

$$M_{spring} = (T_{spring})^2 \cdot M_{added} \quad \text{(Eq. 14)}$$

Use of the spring 120, with the added masses 124, may allow the second resonance frequency of the system to be tuned so that the second resonance frequency is within the seismic frequency range of interest, thereby improving the efficiency of the marine vibrator 100 in the seismic band.

$$f_{resonance\,2} = \frac{1}{2\pi} \sqrt{\frac{K_{spring} + K_{shell}}{(T_{spring})^2 \cdot M_{added} \cdot (M_{shell} + M_{mass\,load})}} \quad \text{(Eq. 15)}$$

where $K_{spring}$ is the spring constant of spring 120, and $K_{shell}$ is the spring constant of outer shell 102.

Accordingly, it may be possible, as shown above, to select the masses 124 on the spring 120 to tune the second resonance frequency. It may also be possible to select the extent of influence the second resonance frequency may have on the system. By way of example, if the spring 120 has a low spring constant compared to the outer shell 102, and a matching mass 124 is added to the spring 120, the spring 120 with its mass 124 will function relatively independently from the outer shell 102. In such cases, the second resonance frequency may be as follows:

$$f_{resonance\,2} = \frac{1}{2\pi} \sqrt{\frac{K_{spring}}{(T_{spring})^2 \cdot M_{added}}} \quad \text{(Eq. 16)}$$

In the same way, it may also be possible in some embodiments to make the second resonance frequency very large by selecting a high spring constant for the spring 120 with a matching mass 124 such that the second resonance frequency will have a larger amplitude than the first resonance frequency.

Figure 9:
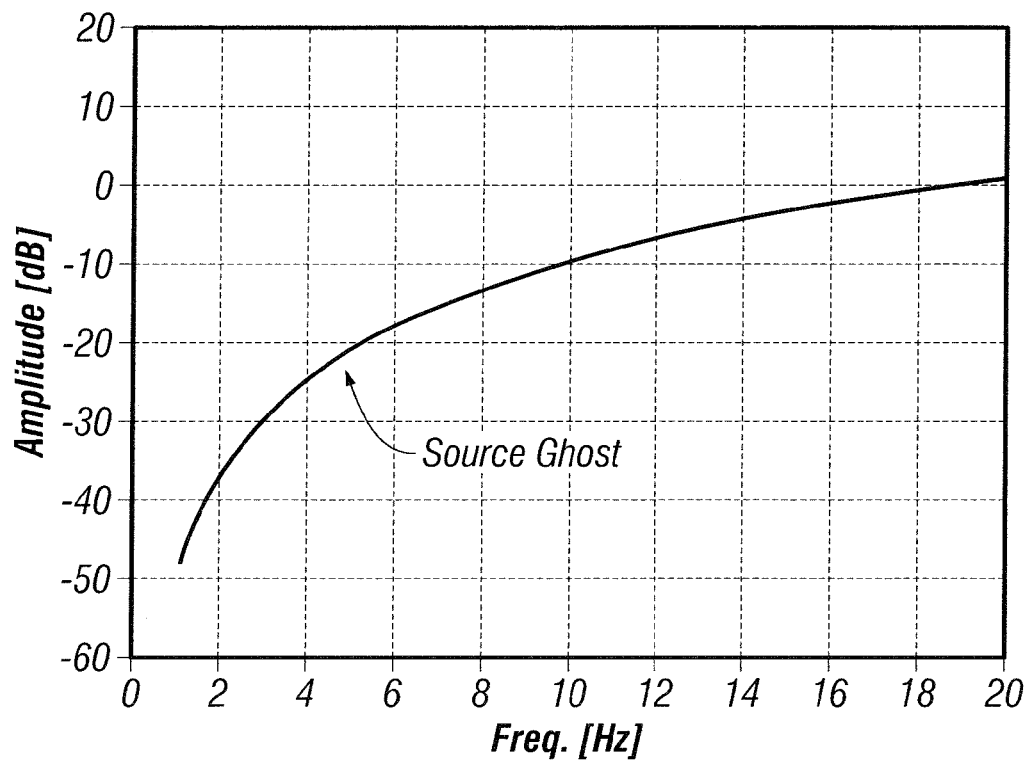
FIGS. 9 and 10 are plots showing effects of the source ghost for an example marine vibrator at 10 meters and 100 meters, respectively, in accordance with example embodiments.
Figure 10:
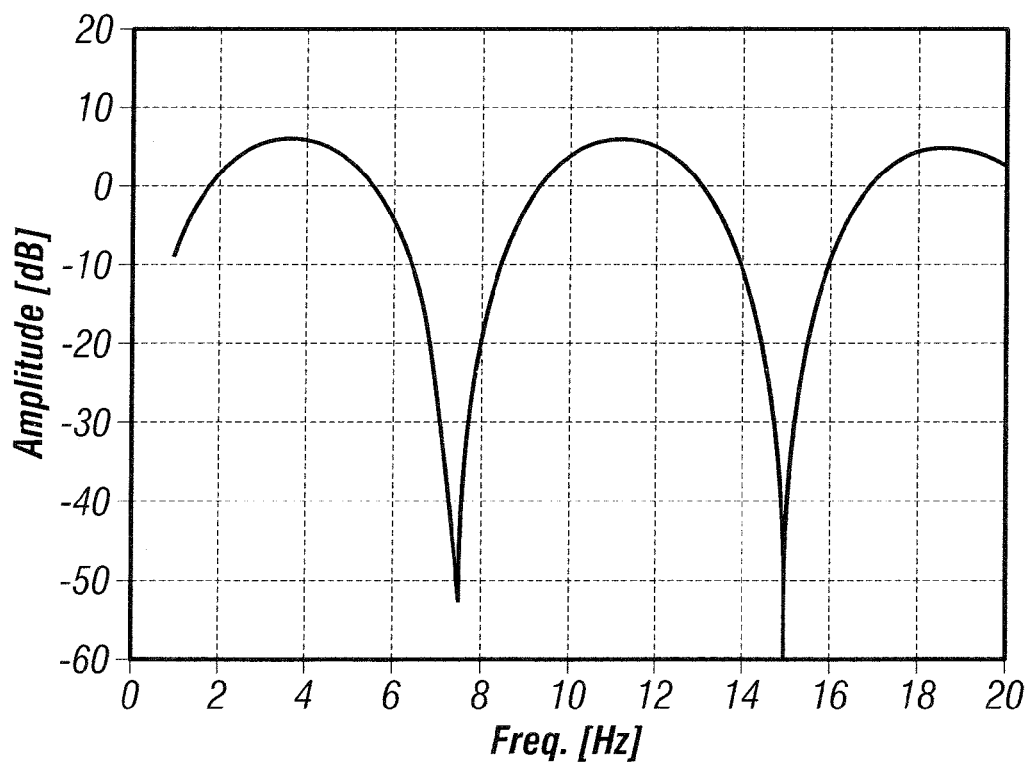

In some embodiments, the marine vibrator 100 may be towed relatively deep, for example, from about 10 meters to as deep as 100 meters or more. FIGS. 9 and 10 are example plots illustrating the attenuation of a marine vibrator 100 due to the source ghost. FIG. 9 shows the attenuation due to the source ghost at 10 meters. FIG. 10 shows the attenuation due to the source ghost at 100 meters. Accordingly, the marine vibrator 100 must be towed deeper as can be seen in FIGS. 9 and 10 otherwise the source ghost will undesirably attenuate the signal.

Figure 11:
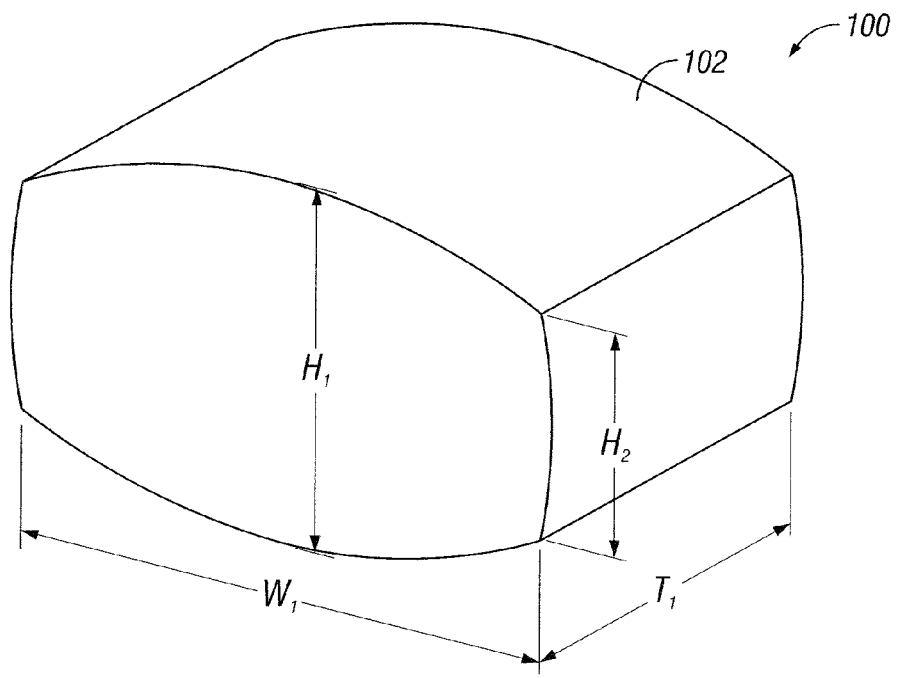
FIG. 11 illustrates an example embodiment of a marine vibrator in accordance with example embodiments.

The dimensions of the marine vibrator 100 may vary as needed for a particular application. With reference to FIG. 11, an example embodiment of a marine acoustic vibrator 100 may have a shell size as follows: 1) Shell Height $H_1$ ranging from about 0.5 meters to about 4 meters; 2) Shell End Height $H_2$ of shell end ranging from about 0.3 meters to about 1 meters; 3) Shell Width $W_1$ ranging from about 0.5 meters to about 4 meters, 4) Shell Thickness $T_1$ ranging from about 0.2 meters to about 3 meters. As illustrated, the Shell Height $H_1$ is the height of the shell 102 at or near its midline while Shell End Height $H_2$ is the height of the shell 102 at its longitudinal end. In particular embodiments, the marine vibrator 100 may have a shell size as follows: 1) Shell Height $H_1$ of 1.59 meters; 2) Shell End Height $H_2$ of 1.0 meters; 3) Shell Width $W_1$ of 1.75 meters; 4) Shell Thickness $T_1$ of 2.5 meters.

Figure 12:
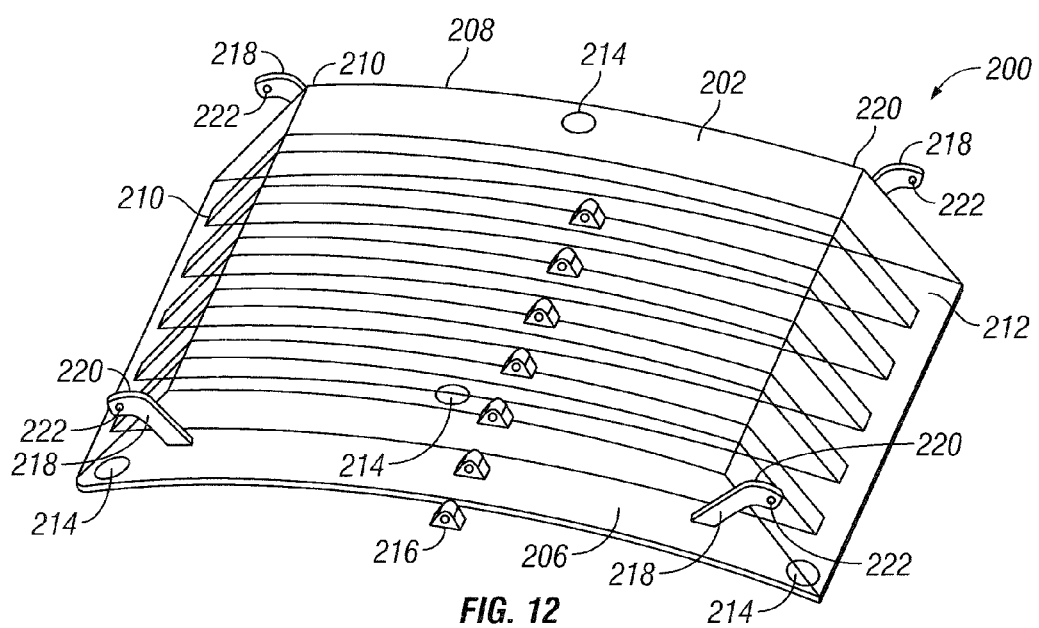
FIG. 12 is a top perspective view of an example embodiment of a container for adding a variable mass load to a marine vibrator in accordance with example embodiments.
Figure 13:
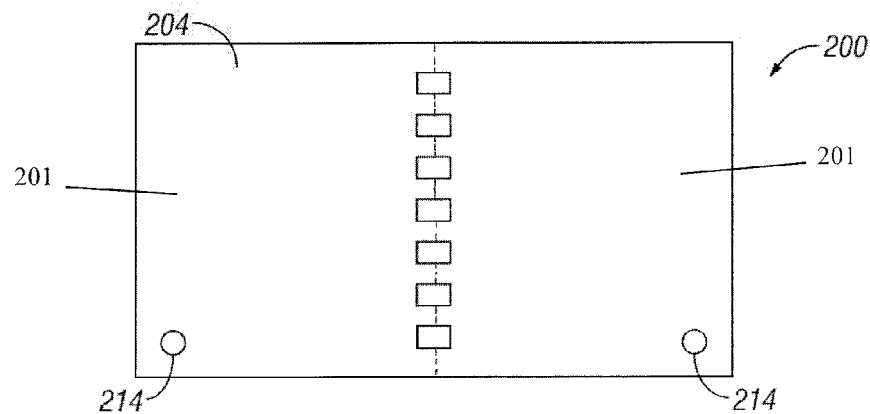
FIG. 13 is a bottom view of an example embodiment of a container for adding a variable mass load to a marine vibrator in accordance with example embodiments.

FIGS. 12 and 13 illustrate a container 200 for adding a variable mass load to a marine vibrator 100 (e.g., shown on FIGS. 4-6) in accordance with some embodiments. As illustrated, the container 200 may comprise an upper surface 202, a lower surface 204, a front side wall 206, a rear side wall 208, a left side wall 210, and a right side wall 212. The front side wall 206, rear side wall 208, left side wall 210, and right side wall 212 each may vertically extend from the lower surface 204 to interconnect the upper surface 202 and the lower surface 204. In the illustrated embodiment, the left side wall 210 and the right side wall 212 may be slanted inward such that the upper surface 202 has more surface area than the lower surface 204. In particular embodiments, the lower surface 204 may be generally concave in shape while the upper surface 202 may be generally convex in shape. One or more bulkhead plates (not shown) may be provided in the container 200 for providing structural support.

An interior volume may be formed inside the container 200, for example, to hold water. As illustrated, holes 214 may be formed to allow ingress of water into the interior volume of the container 200. When the container 200 is lowered into the water, water may enter the container 200 by way of the holes 214 to add mass to the marine vibrator 100. The water may exit the container 200 as it is lifted out of the water. In this manner, the container 200 may add little mass to the marine vibrator 100 at the surface but can add mass to the marine vibrator 100 at depth based on the amount of water in the container 200. In some embodiments, the interior volume of the container 200 may divided into a plurality of compartments 201, for example, which may configured to selectively fill at different depths under water. Accordingly, the container 200 may be optimized to provide a variable mass load to the marine vibrator 100 based on depth, thus allowing optimization of the resonance depending upon depth. For example, if the marine vibrator 100 is towed at 40 meters only a portion of the container 200 may be filled with water while at 120 meters of depth the entire container 200 may be filled with water. In the illustrated embodiment, a pair of holes 214 is formed in the upper surface 202 and a pair of holes 214 is formed in the lower surface 204. It should be understood that while only four holes 214 are shown on FIGS. 12 and 13, the particular configuration and number of holes 214 in the container 200 may be varied as desired for a particular application. The number and configuration of the holes 214 may be selected, for example, based on desired rate and amount water ingress into (or egress from) the container 200. In some embodiments, the container 200 may be sized to hold from about 1 $m^3$ to about 4 $m^3$ of water in volume and about 1 $m^3$ of water in some embodiments.

Any suitable technique may be used for attachment of the container 200 to a marine vibrator 100 (e.g., shown on FIGS. 4-6). In some embodiments, a mechanical joint may be used for interconnection of the container 200 and the marine vibrator 100. In particular embodiments, the mechanical joint may be a flexible joint, such as pin joints 216 shown on FIG. 12. As illustrated, the pin joints 216 may be located at substantially the midline of the lower surface 204 between the left side wall 210 and the right side wall 212. In the illustrated embodiment, a plurality of pin joints 216 is spaced along the midline of the lower surface 204. The pin joints 216 are considered to be at substantially the midline of the lower surface 204 if they are located a distance from the midline of no more than 20% of the length of the lower surface 204 from the left side wall 210 to the right side wall 212. While pin joints 216 are shown, other suitable means for attachment of the container 200 may be used including, for example, linear bearings.

To facilitate fastening of the container 200 to additional devices, such as a frame for tilt stabilization, for example, the container 200 may further include a fastening device. In the illustrated embodiment, the fastening device comprises tab elements 218. As illustrated, the tab elements 218 may extend outwardly from the container 200. In particular embodiments, the tab elements 218 may extend from proximate upper corners 220 of the container 200. As illustrated, the container 200 includes four tab elements 218 that each extend from the upper corners 220, for example. In some embodiments, the tab elements 218 may each include a hole 222.

Figure 14:
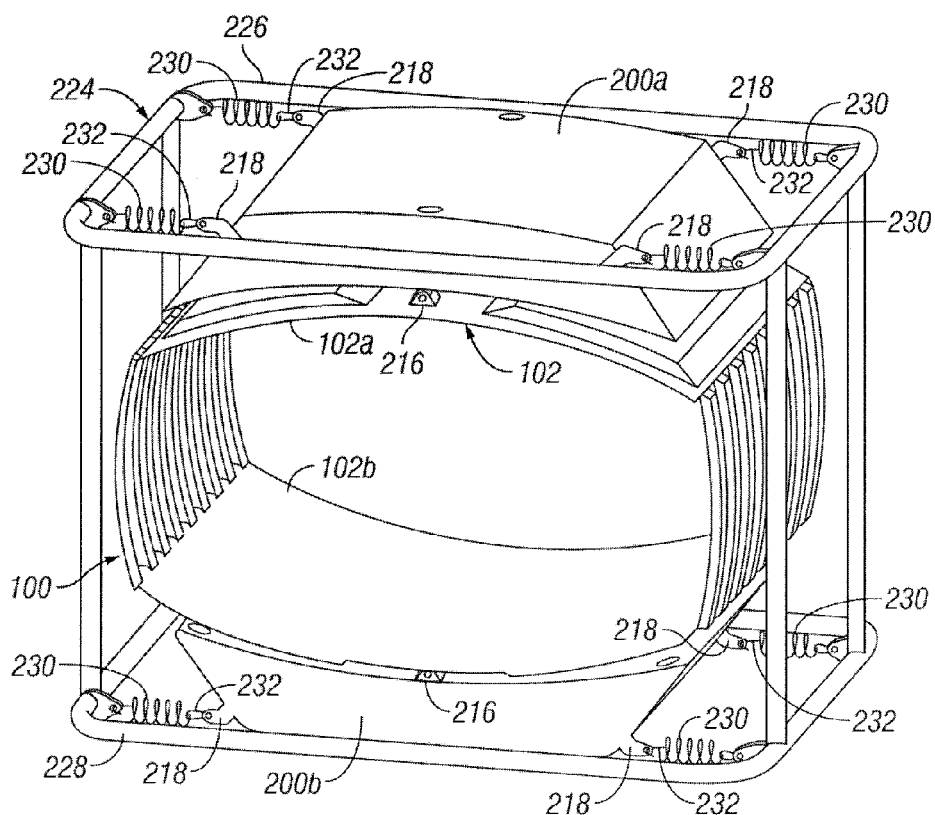
FIGS. 14 and 15 illustrate attachment of the container of FIG. 12 to a marine vibrator in accordance with example embodiments.
Figure 15:
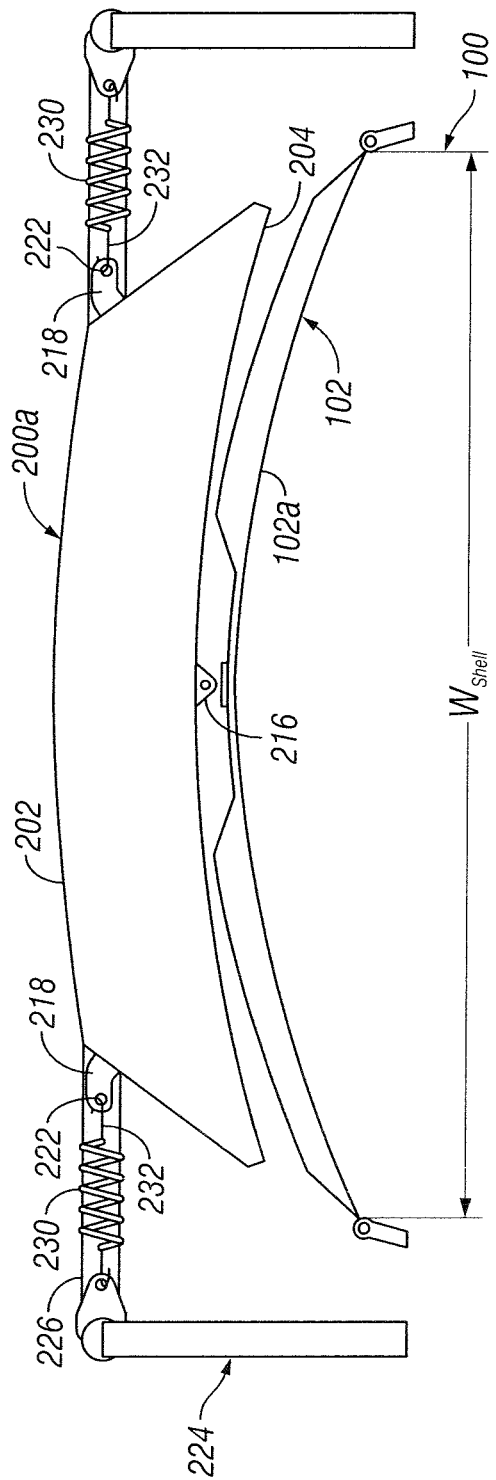

FIGS. 14 and 15 illustrate attachment of containers 200a, 200b to a marine vibrator 100. For simplicity, the marine vibrator 100 is shown without an inner structure, such as the driver (e.g., driver 108 shown on FIG. 4) and other internal components. As illustrated, the containers 200a, 200b may be attached to the outer shell 102 of the marine vibrator 100. It may desired for the containers 200a, 200b to be attached as close as possible to the marine vibrator 100 without contact (other than at attachment points), which may undesirably impact vibrator performance. In some embodiments, the lower surface 204 of the containers 200a, 200b may a distance of about 1 centimeter or less from the outer shell 102. FIG. 14 illustrates attachment of two containers 200a, 200b to the marine vibrator 100, wherein the containers 200a, 200b are attached individually to separate shell side portions 102a, 102b of the outer shell 102. For example, the first container 200a may be attached to shell side portion 102a, and the second container 200b may be attached to shell side portion 102b. While containers 200a, 200b are shown attached to the shell side portions 102a, 102b, embodiments may include attachment of multiple containers 200a, 200b to either of the shell side portions 102a, 102b. As illustrated, the containers 200a, 200b may be attached to the marine vibrator 100 using one or more pin joints 216. In the illustrated embodiment, the container 200 is attached at one or more points along the midline of the outer shell 102 between either hinged shell end. By placement of the container 200 at the midline of the outer shell 102, the resonance frequency of the marine vibrator 100 may be shifted in accordance with example embodiments. In some embodiments, the container 200 may be attached at substantially the midline of the outer shell 102 between either side of the outer shell 102. The container 200 is considered to be attached at substantially the midline if the attachment is a distance from middle of no more than 20% of the width $W_{shell}$ of outer shell between either shell end.

In the illustrated embodiment, the container 200 is further coupled to frame 224. Coupling of the container 200 to the frame 224 may prevent tilting of the container 200, for example, as the marine vibrator 100 may be towed through the water. As illustrated, the frame 224 may surround the outer shell 102. The frame 224 may include an upper frame portion 226 and a lower frame portion 228. As best seen in FIG. 14, the first container 200a may be coupled to the upper frame portion 226, and the second container 200b may be coupled to the lower frame portion 228. The container 200 may be coupled to the frame 224 via one or more springs 230. In some embodiments, the springs 230 may attach to the tab elements 218 of the container 200. For example, the springs 230 may include hooked portions 232 that are secured in the holes 222 of the tab elements 218.

Figure 16:
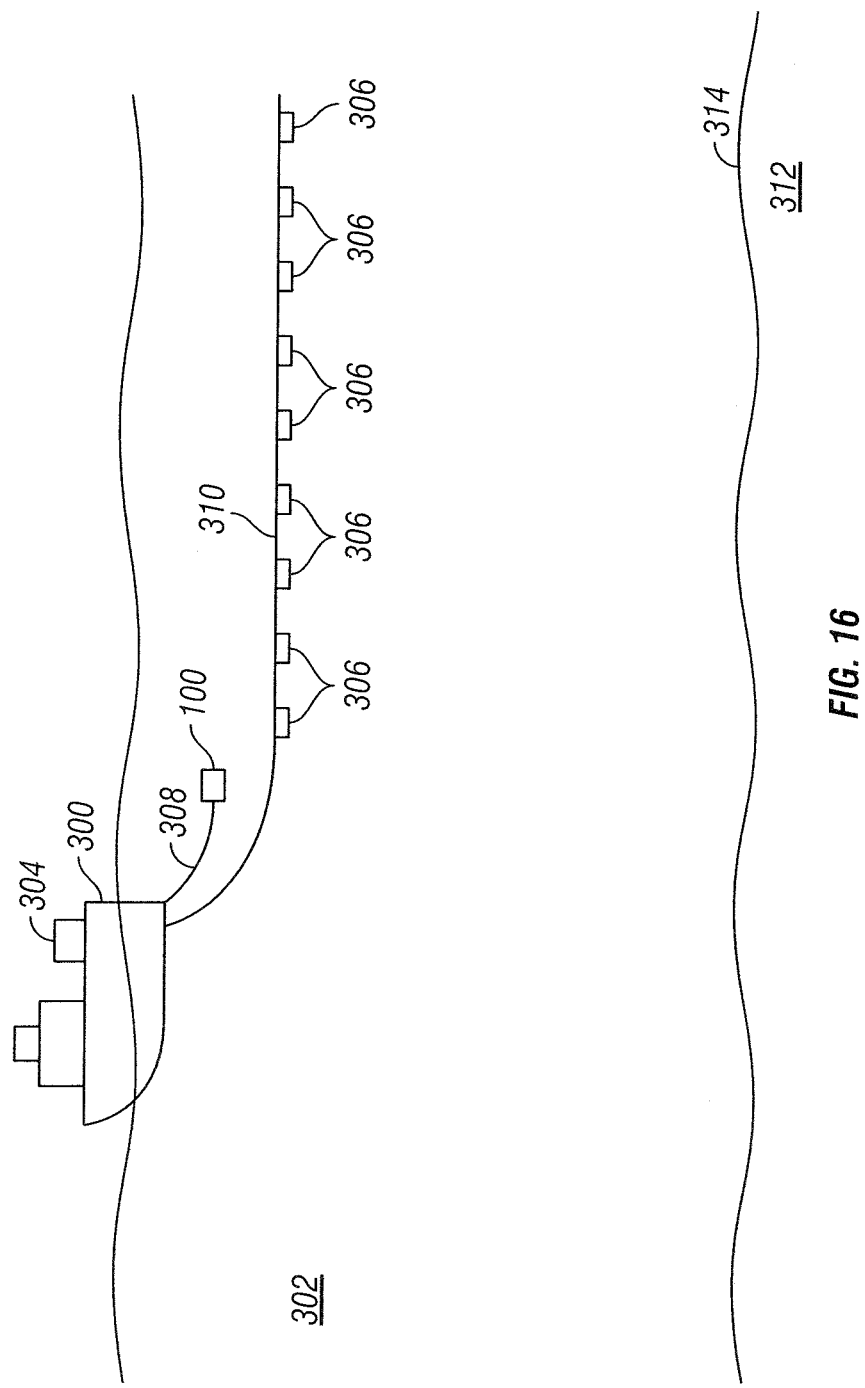
FIG. 16 is an example embodiment of a marine seismic survey system using a marine vibrator.

FIG. 16 illustrates an example technique for acquiring marine seismic data that can be used with embodiments of the present techniques. In the illustrated embodiment, a survey vessel 300 moves along the surface of a body of water 302, such as a lake or ocean. The survey vessel 302 may include thereon equipment, shown generally at 304 and collectively referred to herein as a "recording system." The recording system 304 may include devices (none shown separately) for detecting and making a time indexed record of signals generated by each of seismic sensors 306 (explained further below) and for actuating a marine vibrator 100 at selected times. The recording system 304 may also include devices (none shown separately) for determining the geodetic position of the survey vessel 300 and the various seismic sensors 306.

As illustrated, the survey vessel 300 (or a different vessel) may tow the marine vibrator 100 in the body of water 302. A source cable 308 may couple the marine vibrator 100 to the survey vessel 300. The marine vibrator 100 may be towed in the body of water 302 at a depth ranging from 0 meters to about 120 meters, for example. While only a single marine vibrator 100 is shown in FIG. 14, it is contemplated that embodiments may include more than one marine vibrator 100 towed by the survey vessel 300 or a different vessel. In some embodiments, one or more arrays of marine vibrators 100 may be used. At selected times, the marine vibrator 100 may be triggered, for example, by the recording system 304, to generate acoustic energy. The survey vessel 300 (or a different vessel) may further tow at least one sensor streamer 310 to detect the acoustic energy that originated from the marine vibrator 100 after it has interacted, for example, with rock formations 312 below the water bottom 314. As illustrated, both the marine vibrator 100 and the sensor streamer 310 may be towed above the water bottom 314. The seismic streamer 310 may contain seismic sensors 306 thereon at spaced apart locations. In some embodiments, more than one sensor streamer 310 may be towed by the survey vessel, which may be spaced apart laterally, vertically, or both laterally and vertically. While not shown, some seismic surveys locate seismic sensors 306 on ocean bottom cables or nodes in addition to, or instead of, a sensor streamer 310. The seismic sensors 306 may be any type of seismic sensors known in the art, including hydrophones, geophones, particle velocity sensors, particle displacement sensors, particle acceleration sensors, or pressure gradient sensors, for example. By way of example, the seismic sensors 306 may generate response signals, such as electrical or optical signals, in response to detected acoustic energy. Signals generated by the seismic sensors 306 may be communicated to the recording system 304. The detected energy may be used to infer certain properties of the subsurface rock, such as structure, mineral composition and fluid content, thereby providing information useful in the recovery of hydrocarbons.

In accordance with an embodiment of the invention, a geophysical data product indicative of certain properties of the subsurface rock may be produced from the detected energy. The geophysical data product may include processed seismic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

The foregoing figures and discussion are not intended to include all features of the present techniques to accommodate a buyer or seller, or to describe the system, nor is such figures and discussion limiting but exemplary and in the spirit of the present techniques.

What is claimed is:
1. A marine vibrator comprising:
a flextensional outer shell;
a driver disposed at least partially within the flextensional outer shell and coupled thereto;

a fixture coupled to the flextensional outer shell, wherein the fixture suspends the driver within the flextensional outer shell; and a container for holding a mass load of water that is variable based on depth of the marine vibrator in a body of water, wherein the container is located exterior to the flextensional outer shell and adds mass to the flextensional outer shell at substantially a midline of the flextensional outer shell, wherein a mechanical joint is used to interconnect the container to the flextensional shell;

wherein the marine vibrator has a resonance frequency selectable based at least in part on the variable mass load.

2. The marine vibrator of claim 1, wherein the marine vibrator has at least two resonance frequencies of about 10 Hz or lower.

3. The marine vibrator of claim 1, wherein the driver comprises an electro dynamic driver.

4. The marine vibrator of claim 1, wherein the container comprises one or more holes for ingress of water when the marine vibrator is placed under water.

5. The marine vibrator of claim 1, wherein the container comprises a plurality of compartments operable to selectively fill at different depths under water.

6. The marine vibrator of claim 1, wherein the mechanical joint comprises one or more pin joints.

7. The marine vibrator of claim 1, further comprising a frame surrounding the flextensional outer shell, wherein the container is coupled to the frame via one or more springs.

8. The marine vibrator of claim 1, wherein the container comprises a plurality of holes for ingress of water when the marine vibrator is placed under water.

9. A marine vibrator comprising:
a flextensional outer shell;
a driver having a first end and a second end, wherein the first end is attached to the outer shell and the second end is attached to a fixture, wherein the fixture is coupled to the flextensional outer shell;
a spring coupled to the flextensional outer shell;
a plurality of masses coupled to the spring; and
a container for holding a mass load of water that is variable based on depth of the marine vibrator in a body of water, wherein the container is located exterior to the flextensional outer shell and adds mass to the flextensional outer shell at substantially a midline of the flextensional outer shell, wherein a mechanical joint is used to interconnect the container to the flextensional outer shell; and
a frame, wherein the frame is positioned to surround the outer shell, wherein the frame is coupled to the container via a plurality of springs.

10. The marine vibrator of claim 9, wherein the marine vibrator has a first resonance frequency and a second resonance frequency that are each about 10 Hz or lower.

11. The marine vibrator of claim 9, wherein the driver comprises an electro dynamic driver.

12. The marine vibrator of claim 9, wherein the container comprises one or more holes for ingress of water when the marine vibrator is placed under water.

13. The marine vibrator of claim 9, wherein the container comprises a plurality of compartments operable to selectively fill at different depths under water.

14. A method comprising:
towing an acoustic vibrator in a body of water, the acoustic vibrator comprising:
a flextensional outer shell;
a driver disposed at least partially within the flextensional outer shell and coupled thereto; and
a container, wherein the container is located exterior to the flextensional outer shell and adds mass to the flextensional outer shell at substantially a midline of the flextensional outer shell, wherein a mechanical joint is used to interconnect the container to the flextensional outer shell, wherein the container comprises a variable mass load of water;
lowering the acoustic vibrator in the body of water, wherein the variable mass load of water in the container increases as the acoustic vibrator is lowered; and
triggering the acoustic vibrator to generate acoustic energy in the body of water.

15. The method of claim 14, further comprising:
detecting the acoustic energy originating from the acoustic vibrator; and
producing a geophysical data product from the detected acoustic energy indicative of certain properties of subsurface rock below the body of water.

16. The method of claim 14, further comprising adjusting the variable mass load of water in the container to adjust the resonance frequency of the marine vibrator.

17. The method of claim 14, further comprising selectively filling a plurality of compartments in the container at different depths in the body of water.

18. The method of claim 14, further comprising operating the marine vibrator at two or more resonance frequencies of about 10 Hz or lower.

19. The method of claim 14, wherein the acoustic vibrator further comprises a frame surrounding the outer shell, wherein the container is coupled to the frame via one or more springs.

* * * * *